United States Patent [19]

Dalton et al.

[11] Patent Number: 5,022,013
[45] Date of Patent: Jun. 4, 1991

[54] UNDERWATER RELEASE APPARATUS, UNDERWATER RELEASE SYSTEM AND METHOD

[75] Inventors: William Dalton; Al Billings, both of North Falmouth, Mass.

[73] Assignee: Datasonics, Inc., Cataumet, Mass.

[21] Appl. No.: 489,457

[22] Filed: Mar. 6, 1990

[51] Int. Cl.$^5$ .................. H04B 1/59; B63B 22/06; B63B 22/26
[52] U.S. Cl. ........................... 367/4; 441/2; 441/33
[58] Field of Search .............. 441/2, 21, 33; 367/133, 367/4

[56] References Cited

U.S. PATENT DOCUMENTS 3,602,959 9/1971 Perez ........................ 441/2
3,848,226 11/1974 Perez ........................ 367/133
4,136,415 1/1979 Blockburger ............... 441/2

*Primary Examiner*—Ian J. Lobo
*Attorney, Agent, or Firm*—Thomas A. Kahrl

[57] ABSTRACT

An improved underwater release apparatus, underwater release system and method of controlled release of an underwater object employing the underwater release apparatus. The underwater release apparatus comprises a housing release means mounted on a housing, a securing means for holding the housing at a defined position, the housing release means comprising a pair of load-balanced clamping jaws mounted for movement between a clamping position and a load releasing position, a coupling means attached to a water balanced shaft means slideably mounted on a nonexplosive drive means for driving the shaft between an engaged position and a disengaged position and for releasing the housing from the mooring. The housing release apparatus may be employed in an underwater release system including a transmitter adapted to transmit command signals to a receiver mounted in a housing attached to a mooring means adapted to secure the housing at a defined depth in the water and a buoy means to provide positive flotation for the housing for positioning at a defined depth and for retrieval upon release from the mooring by upon the command from the transmitter and released by the housing release means.

11 Claims, 4 Drawing Sheets

UNDERWATER RELEASE APPARATUS, UNDERWATER RELEASE SYSTEM AND METHOD

BACKGROUND OF THE INVENTION

It is desirable when mooring objects in bodies of water for subsequent retrieval, such as subsea instruments mounted on a housing used for collecting and recording underwater data, to position the instruments below the surface of the water to obtain measurements at substantial depths, or alternatively to avoid damage or outright loss or dislocation due to wave action in storms or being struck by passing ships.

Underwater release mechanisms of which applicant is aware are shown in U.S. Pat. Nos. 3,848,226 and 4,136,415.

Retrieval of such moored instruments in the past has been accomplished by attaching a surface buoy attached with a cable to the instrument positioned to be picked up by a surface vessel, however such retrieval buoys run the same risks of outright loss and detection and are difficult to locate.

When deep water readings are desired, where instruments are anchored up to depths of 8000 meters, use of surface buoys has been found impracticable. Accoustical underwater release mechanisms have been developed such as disclosed in U.S. Pat. Nos. 3,848,226 and 4,136,415 where moored instruments have been provided which, at a remote command in the form of an acoustic signal, release the instruments from a mooring or apparatus or ground tackle, typically an anchor and cable, and permit the instruments attached to the release mechanisms typically connected to a flotation device to permit the instruments and release device to rise to the surface of the body of water to be retrieved upon sighting by a ship-borne retrieval party. Prior art acoustic underwater release mechanisms, particularly as referred to above, have employed a fixed post and movable-hook type release device for securing loads at substantial depths, wherein the acoustic release mechanisms having a top end and a bottom end are oriented in a upright position with the release mechanism attached to the bottom end and the mooring line and a floater buoy is attached to the top. Typically, explosive detonators are used to activate the release device to break open the release device to disconnect the moored object from the anchor and anchor cable. Such release mechanisms have provided adequate service at shallow depths, however at greater depths when the pressure is in the range of 10,000 PSI they have malfunctioned due to intermittent failure to overcome exterior water pressures and release the instrument from the mooring. Furthermore, such release mechanisms being unbalanced, when used at depths of 8000 meters where pressure of 10,000 PSI are encountered, tend to hang up as the release mechanism at times fails to overcome the substantial pressure acting against the single movable hook release device.

SUMMARY OF THE INVENTION

The present invention is directed to an improved underwater release apparatus and to an underwater release system employing the improved underwater release apparatus and to a method of controlled release a moored underwater object such as a housing containing a sub sea instrument for measuring ocean conditions employing the underwater release apparatus of the invention.

The present invention comprises an improved underwater release apparatus including a housing release means adapted to be mounted on a housing having a one end and an other end, a securing means such as an anchor and a cable for holding the housing release means at a defined position, a pair of load-balanced clamping jaws mounted for movement between a clamping position and a load releasing position, a water balanced shaft means slideably mounted on a nonexplosive drive means for driving the shaft means between an engaged position and a disengaged position and for releasing the housing from the mooring. The housing release means is adapted to be mounted on the one end of the housing includes a frame, a plurality of clamping jaws to move between a clamping and a nonclamping position, an inner housing with a bore for a shaft, and a shaft means having a one and other end disposed within the bore, with a flow passage way having a one end and other end to permit water in a chamber of the housing with the shaft means extending outside of the housing at the one end and mounted to move between a release and a nonrelease position, a coupling mounted on the one end of the shaft means in mating relationship with a recess provided in the frame for movement between a coupling and a noncoupling position, a motor, such as an electric battery operated motor, mounted in the housing, a drive train means in the housing connected to the motor and the shaft means to move between a release and a nonrelease position, and a switch connected to the motor.

The frame comprises a pair of parallel spaced apart plates extending outwardly from an end cap secured to the one end of the housing. A pin is provided extending perpendicularly between the plates positioned along the central axis of the housing for rotably mounting the pair of clamping jaws. The end cap includes a central bore positioned along the central axis of the housing release means having a surrounding annular cavity for receiving a cylindrically shaped coupling.

The pair of clamping jaws having a first clamping jaw and a second clamping jaw are pivotably mounted in scissors like fashion on the pin extending between the two parallel plates of the frame, for movement between the clamping and a nonclamping position. The first and second clamping jaws having a one end and the other end, the one end including the lever arm of substantial length having a finger element formed to be received by an annular recess of the coupling, the other end including a curved jaw member of shorter length having an inner semi-circular recess to receive a mooring ring and a clamping surface for mating engagement when the first clamping jaw is closed against the second clamping jaw in the clamping position. The first and second clamping jaws are mounted together with the pin being on the central axis of the housing such that when the lever arms are released by the coupling the clamping jaws have a natural tendency to open. The clamping jaws being mounted along the central axis of the housing are load balanced, each lever arm being pivotably mounted in scissors like manner on the frame to provide easy release as only friction forces need to be overcome when moving the levers from a closed position to an open position. The curved jaw members of the first and the second clamping jaw are adapted to close in mating relationship as the lever arms are compressively held together by the coupling, the jaw members to enclose a ring member attached to the load such as a mooring cable for secure engagement of the load.

A male coupling finger is provided at the extremely adjacent the housing of each lever arm, both lever arms being adapted to be fitted together upon the closing of the lever arms and to be engaged by the coupling by the central annular recess of the coupling secured to the pressure balanced shaft when in the extended engaged position. The lever arms and the frame preferably are constructed of stainless steel material. As the coupling is drawn upwardly by the shaft means the male coupling members are released from being held together from the annular recess of the coupling and the coupling arms freely drop open to release the ring attachment of the load, no other force needed for release.

The shaft means is adapted to be water pressure balanced having a one end and an other end comprised of a shaft slideably disposed within the longitudinally extending bore provided in the inner housing having water tight seals for preventing leakage of water under high pressure from leaking into the air tight compartment of the housing and having a central passage way extending from a water inlet at the one end to water outlet at the other end of the shaft for providing equal water pressure at any depth at the one end and the other end of the shaft means. The shaft means also comprises a jack screw for engaqing jack screw means for raising and lowering the shaft means and an indicating means for cooperation with the sensing means such as the receiver for controlling the actuation of the motor responsive to a command such as an acoustic signal. The motor means typically is an electric battery operated motor and is mounted at the end of the inner housing and extends into the air tight compartment of the housing.

The switch means is mounted on the side of the shaft means for communication with the indicator mounted on the shaft for de-energizing the electric motor in the engaged position and for energizing the motor upon the receipt of an acoustic signal to release the mooring.

The present invention may be employed in an underwater release system whereby a transmitter is adapted to be positioned below the surface of a body of water and on command transmit signals to a receiver, typically the receiver is mounted in a housing including the underwater release apparatus attached to a mooring means such as an anchor and a cable with a ring, adapted to secure the housing, adapted to contain instrumentation means at a defined depth in a body of water, a securing means such as a ring or shackle for securing the housing to the mooring means and a buoy means to provide position positive flotation for the housing for positioning at a defined depth and for retrieval upon release from the mooring by the housing release means.

The invention also includes a method for controlled release of an underwater release apparatus which method comprises, (a) the steps of mooring the release apparatus at a defined depth by attachment to a mooring means by a ring, (b) providing a housing including an instrument means for recording underwater conditions including a release means having a plurality of clamping jaws, (c) sending a command signal from the transmitter, (d) receiving the command signal by a receiver to energize a switching means, (e) activating a motor means to drive a drive train means to drive a pressure balanced shaft between an extended nonrelease engaged position to a nonextended, nonengaged position, (f) moving a coupling means from a coupled position to an uncoupled position, (g) permitting a pair of clamping jaws to move from a clamping position to a nonclamping position, (h) releasing the mooring means consisting of a ring and an anchor and a cable, (i) permitting the housing to float to the surface provided by a buoy means responsive to positive flotation, (j) thereby permitting the housing to be retrieved while floating adjacent the surface of the water.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

DESCRIPTION OF THE EMBODIMENTS

Figure 1:
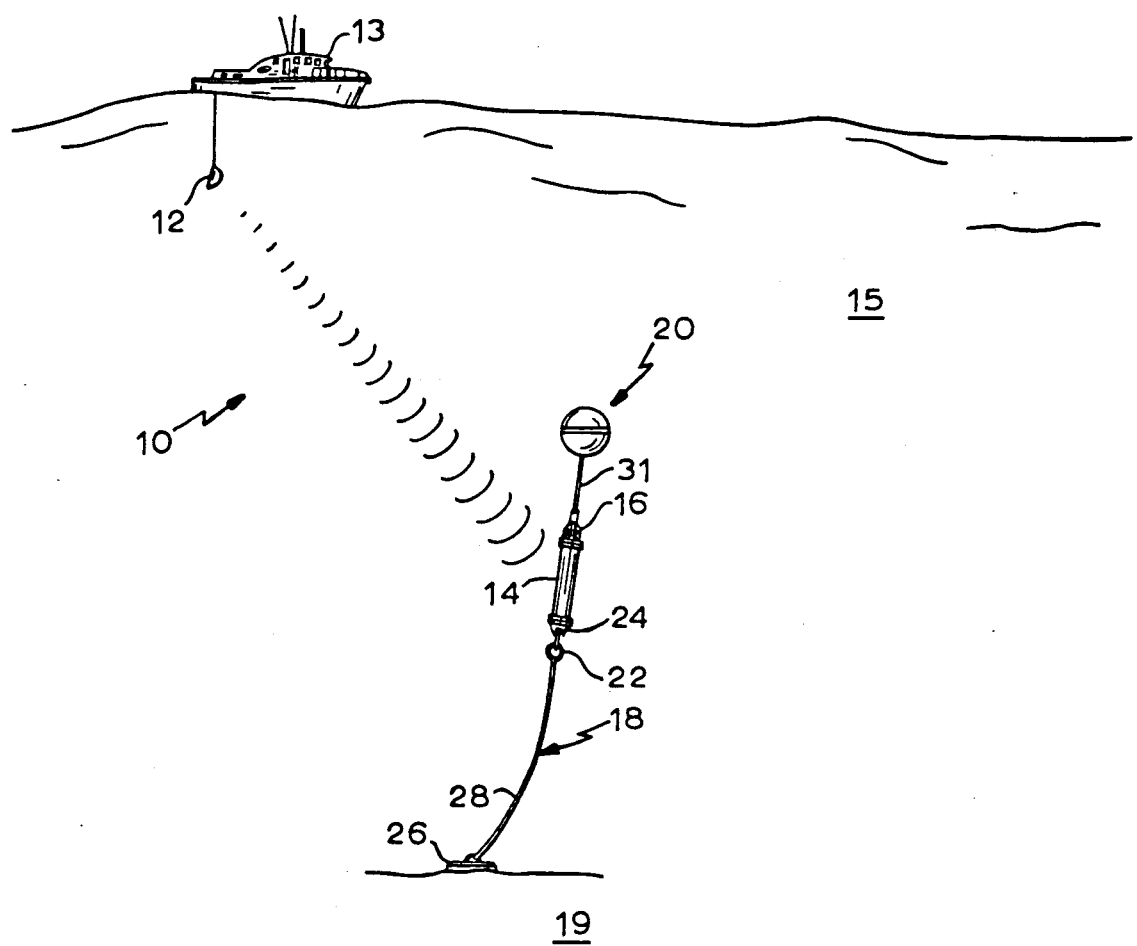
FIG. 1 is a diagrammatic view illustrating an underwater release system embodying the present invention.

With reference to the drawings, FIG. 1 shows an underwater release system 10 including a transmitter 12 attached to a surface vessel 13 on a body of water 15, a housing of elongated construction 14, having a one end and other end, a receiver 16 mounted at the other end of the housing 14, a moorinq means is extending upwardly from the floor 19 of the body of water 15, the housing 14 attached to a ring means 22 at the one end of the housing, 14 a subsurface buoy means 20 attached to the other end of the housing 14 adjacent the receiver 16, and a housing release means 24 secured to the one end of the housing 14 in engagement with the ring means 22.

The mooring means includes an anchor 26 resting on the floor 19 of the body of water 15 and a cable 28 attached to the ring means 22. The buoy means 20 includes a subsurface buoy 29 having a positive flotation attached to a line 31 which is secured to the other end of the housing 14 to orient the housing in an upright position at a designated depth determined by the length of the cable 28, typically from 6,000 to 8,000 meters depth.

Figure 2:
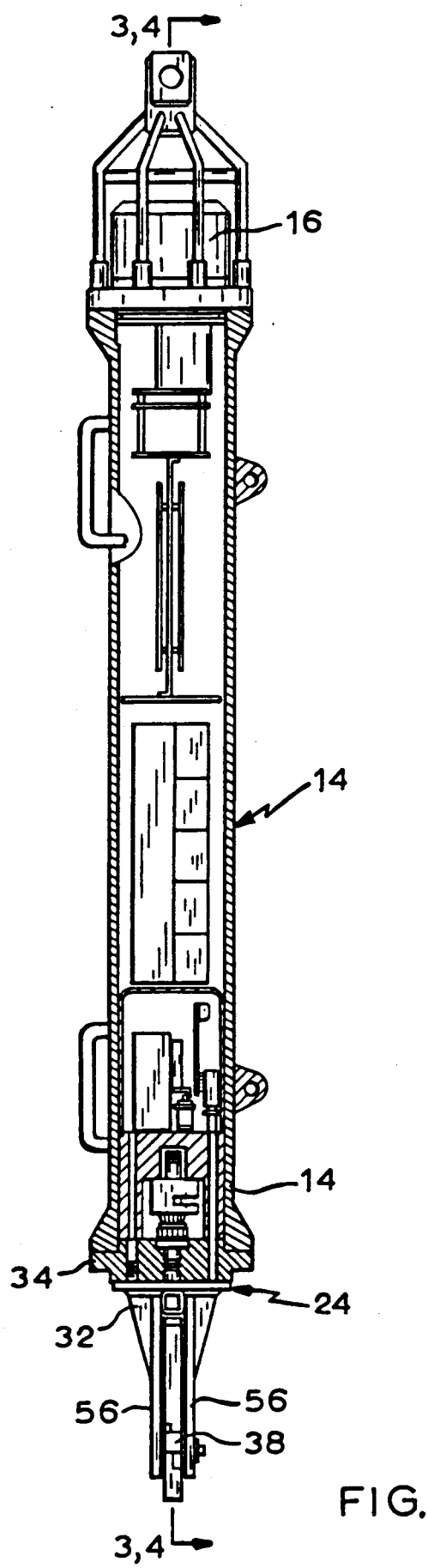
FIG. 2 is a cross-sectional elevational view of the release mechanism of the invention shown in FIG. 1, in combination with an acoustic transponding device.

As shown in FIG. 1 the housing 14 is oriented vertically by the buoyancy of the subsurface buoy 29 such that the one end is directed downwardly toward the ocean floor 19 and the other end is directed upwardly towards the subsurface buoy 29. The housing release means 24 attached to the one end of the housing 14 comprises a frame 32 extending outwardly and normally downwardly secured to an end plate 34 of disk shaped construction for sealably enclosing the one end of the housing 14; a pair of clamping jaws 36 mounted on a pin 38 for movement between a clamping position shown in FIG. 3 and a nonclamping position shown in FIG. 4; an inner housing 4 is mounted within the central cavity 42 provided in the housing 14 and in coaxial alignment therewith adjacent the one end, the housing 14 having an inner mounting surface and an outer mounting surface and includes a bore 44 for extending longitudinally along the common central axis of the inner housing 40 and the housing 14; a pressure balanced shaft 46 slideably received by the bore 44 having a one end and other end for movement between a released position shown in FIG. 4 and a nonreleased position shown in FIG. 3; a coupling 42 mounted on the one end of the shaft 46; a motor means 50 mounted on the inner mounting surface of the inner housing 40 extending longitudinally normally upwardly; a drive train means 52 connected to the motor 50 and to the shaft 46 to move the shaft 46 between a release and a nonrelease position; and a switch 54 connected to the motor and signal means such as the receiver 16 shown in FIG. 2.

The frame 32 comprises a pair of parallel spaced apart plates 56 extending outwardly from the end cap 34 being mounted in coaxial alignment with the housing 14 secured to the one end of the housing 14. A pin 38 is provided extending perpendicularly between the plates 56 positioned along the central axis of the housing 14 for rotably mounting the pair of clamping jaws 36. The end cap 34 includes a central bore $s$ positioned along the central axis of the housing release 24 having a surrounding annular cavity 60 for receiving the cylindrically shaped coupling 48.

Figure 3:
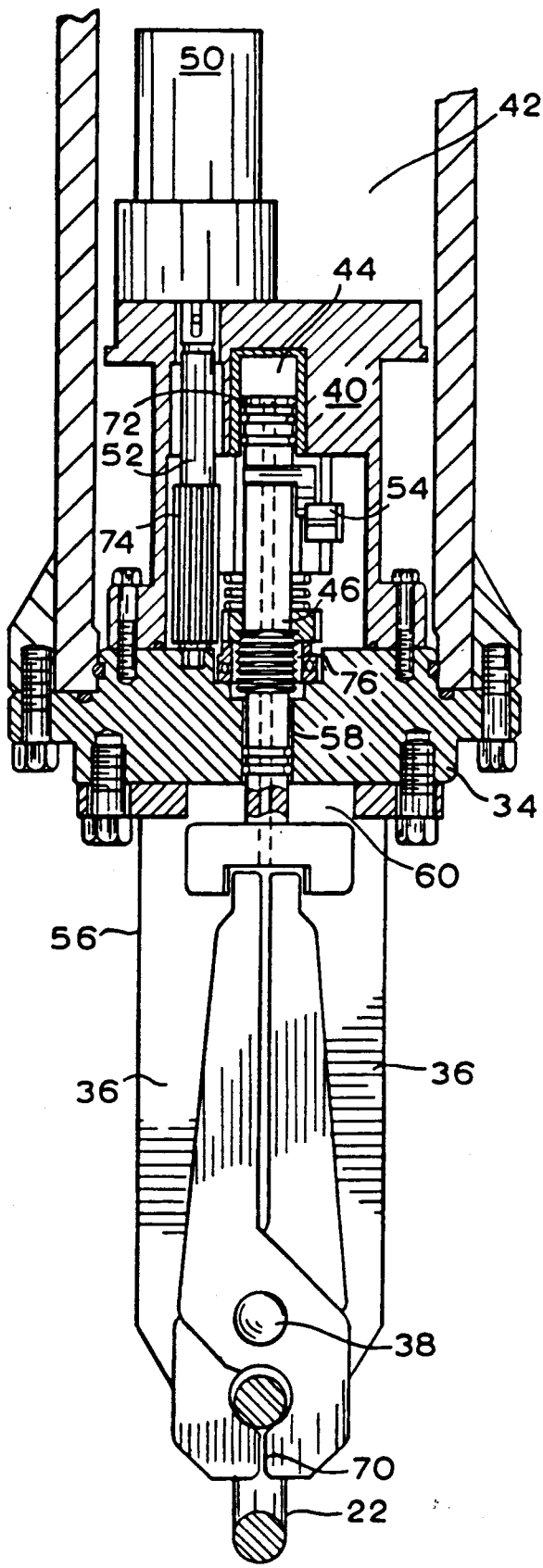
FIG. 3 is a sectional view, partially in section, of the release mechanism of the invention of FIG. 2 shown in the engaged position.
Figure 4:
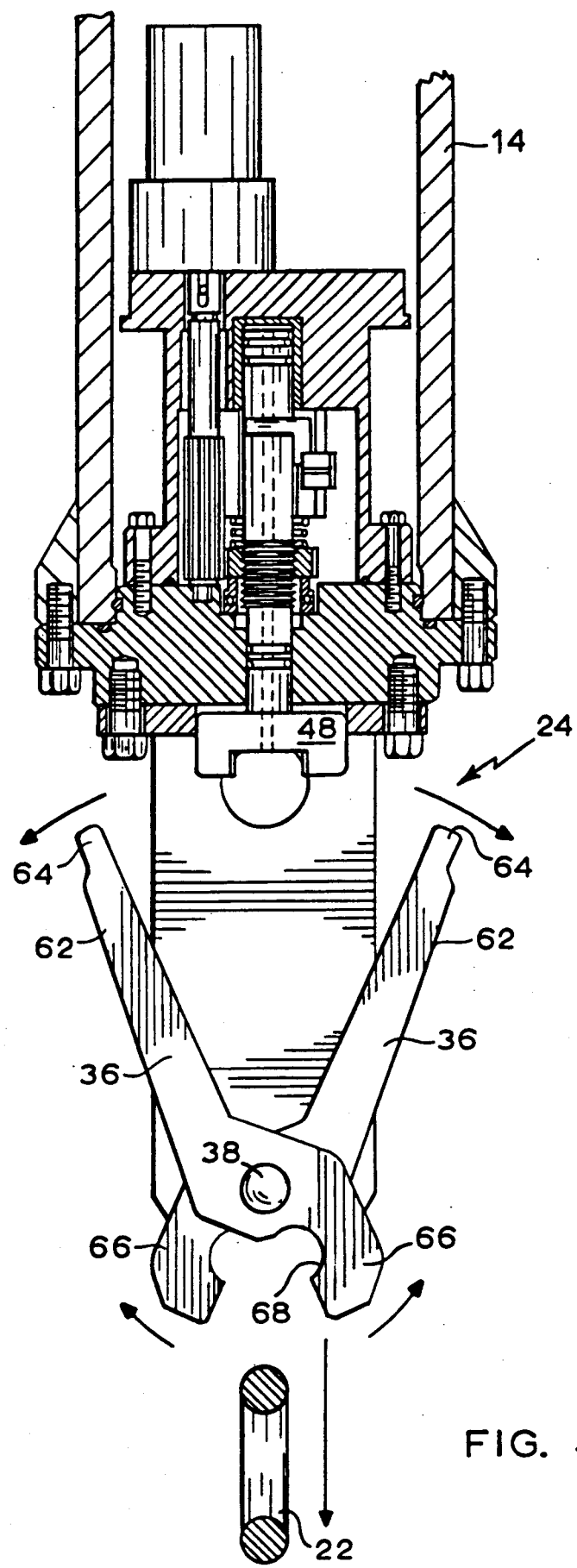
FIG. 4 is a sectional view of the release mechanism of the invention of FIG. 2 shown in the release position.

The pair of clamping jaws 36 having a first clamping jaw and a second clamping jaw are pivotably mounted on scissors like fashion on the pin 32 extending between the two parallel plates 56 of the frame for movement between the clamping and the nonclamping position. The first and second clamping jaws have a one end and other end, the one end including a lever arm 62 of substantial length having a finger element 64 formed to be received by an annular recess 60 of the coupling 48, the other end including a curved jaw member 66 of shorter length having an inner semi-circular recess 68 to receive the mooring ring 22 and including a clamping surface 70 for mating engagement when the first clamping jaw is closed against the second clamping jaw in the clamping position as shown in FIG. 3.

A shaft 46 having a one end and an other end as slideably disposed within the bore 44 having a plurality of water tight seals 72 and a central passage way 74 for extending from a water inlet at the one end to a water outlet at the other end. The shaft 46 also comprises a jack screw 76 connected to the drive train means 52. Mounted adjacent the shaft 46 an indicator means is provided for cooperation with the sensing means such as the receiver 1 6 for controlling actuation of the motor 50 responsive to a command such as an accoustical signal. The motor means 50 typically is an electric battery operated motor and is mounted at the end of the inner housing 40.

What is claimed is:
1. In an underwater release system which comprises;
(a) a transmitter.,
(b) a housing having a one and other end;
(c) a receiver in the housing.,
(d) a mooring means to secure the housing at a defined depth;
(e) a buoy means to provide flotation for the housing and receiver means positioning at a defined depth and retrieval;
(f) a ring or securing means to secure the housing to the mooring means, the improvement which comprises;
(g) a housing release means to release the securing means comprising;
(i) a frame;
(ii) a plurality of clamping jaws to move between a clamping and a nonclamping position;
(iii) an inner housing with a bore for a shaft;
(iv) a shaft means in the bore having a shaft with flow passage way having a one end and other end to permit water in a chamber of the housing, the shaft extending outside of the housing at the one end to move between a release and a nonrelease position;
(v) coupling means mounted in cooperation with the frame secured to one end of the shaft for movement therewith and to move between a coupling and noncoupling position;
(vi) motor means in the housing.
(vii) drive train means in housing connected to motor means and to the shaft means to move between a release and a nonrelease position;
(viii) switch means to receive switching signals and activate the motor means wherein on command received by the transmitter means and communicated to the switch means the motor means is activated to drive the drive train which drives the shaft from an extended nonrelease engaged position to a nonextended nonengaged position to effect the movement of the coupling means to an uncoupled. unengaged position which permits the clamping jaws to move to a released open position releasing the mooring means to permit the housing so to rise to the surface by the use of the buoy means

2. The underwater release system of claim 1 wherein the frame comprises a pair of plates mounted spaced apart in parallel relationship extending outwardly from the one end of the housing having a pin for mounting the clamping jaws.

3. The release apparatus of claim 1 wherein the frame is attached to an end cap having an inner and outer mounting surface sealably attached to one end of the housing wherein sea water is sealed out of the housing.

4. In an accoustical underwater release system which comprises;
(a) an accoustical signal transmitter means adapted to be placed beneath the surface of the water and to transmit an accoustical signal to a accoustical receiver means;
(b) a housing having a one and the other end and adapted to be placed in a defined depth in the water;
(c) a buoy means secured to the one end of the housing to provide Positive flotation to the housing.,
(d) a ring means secured to the other end of the housing;
(e) a mooring means secured to the ring means. to secure the housing at a defined depth in the water;
(f) an accoustical receiver means in the housing to receive accoustical signals from the signal transmission means the improvement which comprises.
(g) a housing release means to release the securing means comprising;
(i) a frame comprising a pair of plates mounted spaced apart in parallel relationship extending outwardly from the one end of the housing:
(ii) a plurality of clamping jaws to move between a clamping and a nonclamping position mounted on the frame.,
(iii) an inner housing mounted within the housing at the one end of the housing having a central bore for receiving a pressure balanced shaft means;

(iv) a pressure balanced shaft means comprising a shaft having a one and the other end and characterized by a central passage way therein having a water inlet at the one end and a water outlet at the other end, the shaft means slideably and sealably received in the central bore of the inner housing for movement between an extended nonrelease position with the one end of the shaft extending from the one end of the housing and a nonextended engaged position with the shaft withdrawn at the one end of the housing;

(v) a coupling means secured to the one end of the shaft for movement therewith between a coupling position and an uncoupled position;

(vi) a drive train means for driving the pressure balanced shaft means between an engaged position to a release position responsive to input from a switch means;

(vii) a motor means for driving the drive gear train means to move the pressure balanced shaft means between a first inwardly projecting position and a second outwardly projecting position;

(viii) a power source means for energizing the motor means;

(ix) the switch means being in communication with the accoustical receiver means for activating the motor means on command initiated by the surface borne transmitter and received by the acoustic transponding receiver.

5. A method for controlled release of an underwater release apparatus which method comprises;
 (a) providing a transmitter;
 (b) mooring the underwater release apparatus at a defined depth by attachment to a mooring means by a ring means;
 (c) providing a housing including an instrument means for recording under. water conditions, a receiver means for receiving signals and a release means having a plurality of clamping jaws;
 (d) sending a command signal from the transmitter;
 (e) receiving the command signal by a receiver to energize a switching means;
 (f) activating a motor means to drive a drive train means to drive a Pressure balanced shaft between an extended nonrelease engaged position to a nonextended, nonengaged position;
 (g) moving a coupling means from a coupled position to an uncoupled position;
 (h) permitting a pair of clamping jaws to move from a clamping position to a nonclamping position;
 (i) releasing the mooring means consisting of a ring and an anchor and a cable;
 (j) permitting the housing to float to the surface responsive to positive flotation provided by a buoy means thereby permitting the housing to be retrieved while floating adjacent the surface of the water.

6. An underwater release apparatus in combination with a sealed housing comprising:
 (a) a frame comprising a pair of plates mounted spaced apart in parallel relationship having a transversed pin;
 (b) a release means comprising a pair of clamping jaws having a first clamping jaw and a second clamping jaw pivotably mounted in scissors like fashion on the pin extending between the two parallel plates of the frame for movement in a scissor like fashion between a clamping and a nonclamping position, the first and second clamping jaws having a one and other end the one end including a lever arm of substantial length having a finger element formed to be received by a coupling means;
 (c) an inner housing mounted within the housing at the one end of the housing having a central bore for receiving a pressure balanced shaft means;
 (d) a pressure balanced shaft means slideably mounted for longitudinal movement along the axis of the shaft responsive to a drive means between an engaged position and a disengaged position;
 (e) the drive means having an electric power source for driving the shaft means along the longitudinal axis of the housing between an engaged position and a disengaged position;
 (f) a coupling means secured to the one end of the shaft adapted to cooperate with the finger elements of the clamping jaws for permitting movement between a coupled position wherein the clamping jaws are locked in a clamped posiotn for securely engaging the securing means and an uncoupled position wherein the clamping jaws are firmly locked in a clamped posiotn for securely engaging the securing means and;
 (g) a securing means for holding the housing release means at a defined position.

7. The release apparatus of claim 6 wherein the housing is adapted to receive an instrument means for recording underwater conditions.

8. The release apparatus of claim 6 wherein the inner housing is disposed in the air tight compartment in the housing compartment extending inwardly attached to the inner mounting surface of an end cap.

9. The release apparatus of claim 6 wherein the pressure balanced shaft means has a one end and another end, one end threadly connected to the coupling slidably received by a central cylinder of the inner housing for movement between a retracted release position to an extended lock position and including a central passage way in water communication with the external surrounding water.

10. The release apparatus of claim 6 wherein the coupling means has a female coupling element secured to the one end of the shaft having a central cavity for holding the male coupling members of the lever arm.

11. The release apparatus of claim 6 wherein the release means includes a pair of balanced lever arms each having a one end and an other end, the one end provided with a jaw member and the other end provided with coupling hinge elements.

* * * * *